(12) United States Patent
Fukushima

(10) Patent No.: US 7,752,462 B2
(45) Date of Patent: Jul. 6, 2010

(54) CONTENT OUTPUT APPARATUS, CONTENT OUTPUT METHOD AND CONTENT ACQUISITION APPARATUS

(75) Inventor: Michihiro Fukushima, Fuchu (JP)

(73) Assignee: Kabushiki Kaisha Toshiba, Tokyo (JP)

(*) Notice: Subject to any disclaimer, the term of this patent is extended or adjusted under 35 U.S.C. 154(b) by 1119 days.

(21) Appl. No.: 11/288,130

(22) Filed: Nov. 29, 2005

(65) Prior Publication Data

US 2006/0117191 A1    Jun. 1, 2006

(30) Foreign Application Priority Data

Nov. 30, 2004    (JP) .............................. 2004-346559

(51) Int. Cl.
G06F 11/30    (2006.01)
G06F 12/14    (2006.01)

(52) U.S. Cl. ............................... 713/193; 726/2; 726/3; 726/4; 726/5; 726/27; 726/30; 380/201; 380/202; 380/203; 725/31

(58) Field of Classification Search ................ 726/2–5, 726/27, 30, 29; 713/193; 725/31; 380/201–203
See application file for complete search history.

(56) References Cited

U.S. PATENT DOCUMENTS

| | | | |
|---|---|---|---|
| 6,141,754 A * | 10/2000 | Choy | 726/1 |
| 6,219,788 B1 * | 4/2001 | Flavin et al. | 713/194 |
| 6,282,653 B1 * | 8/2001 | Berstis et al. | 726/26 |
| 6,728,713 B1 * | 4/2004 | Beach et al. | 707/10 |
| 6,928,545 B1 * | 8/2005 | Litai et al. | 713/185 |
| 7,149,722 B1 * | 12/2006 | Abburi | 705/59 |
| 7,240,033 B2 * | 7/2007 | Kuriya et al. | 705/51 |
| 2002/0159592 A1 * | 10/2002 | Matsushima et al. | 380/201 |
| 2003/0154390 A1 | 8/2003 | Yamauchi et al. | |
| 2003/0190044 A1 * | 10/2003 | Higashi et al. | 380/201 |
| 2004/0009815 A1 | 1/2004 | Zotto et al. | |
| 2005/0089165 A1 * | 4/2005 | Kitani et al. | 380/201 |

FOREIGN PATENT DOCUMENTS

JP    2004-133654    4/2004

* cited by examiner

Primary Examiner—Kambiz Zand
Assistant Examiner—Tongoc Tran
(74) Attorney, Agent, or Firm—Pillsbury Winthrop Shaw Pittman, LLP

(57) ABSTRACT

A content output apparatus of the invention comprises an encryption processing unit configured to apply an encryption processing to the content, a recording unit configured to record the content to which the encryption processing has been applied and identification information which identifies the content itself on the network in the storage device on the network so as to be related with each other, and an output unit configured to read a requested content from the storage device on the basis of a content acquisition request supplied via the network, decrypt the encryption, further apply a predetermined processing to the content, and transmit it on the network.

3 Claims, 4 Drawing Sheets

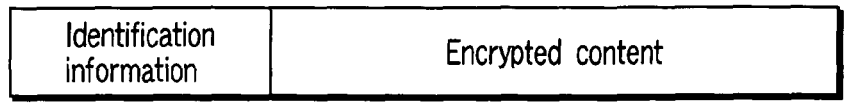
FIG. 3
| Content name a | Identification information |
| --- | --- |
| Content name b | Identification information |
| Content name c | |
| ⋮ | ⋮ |
FIG. 4
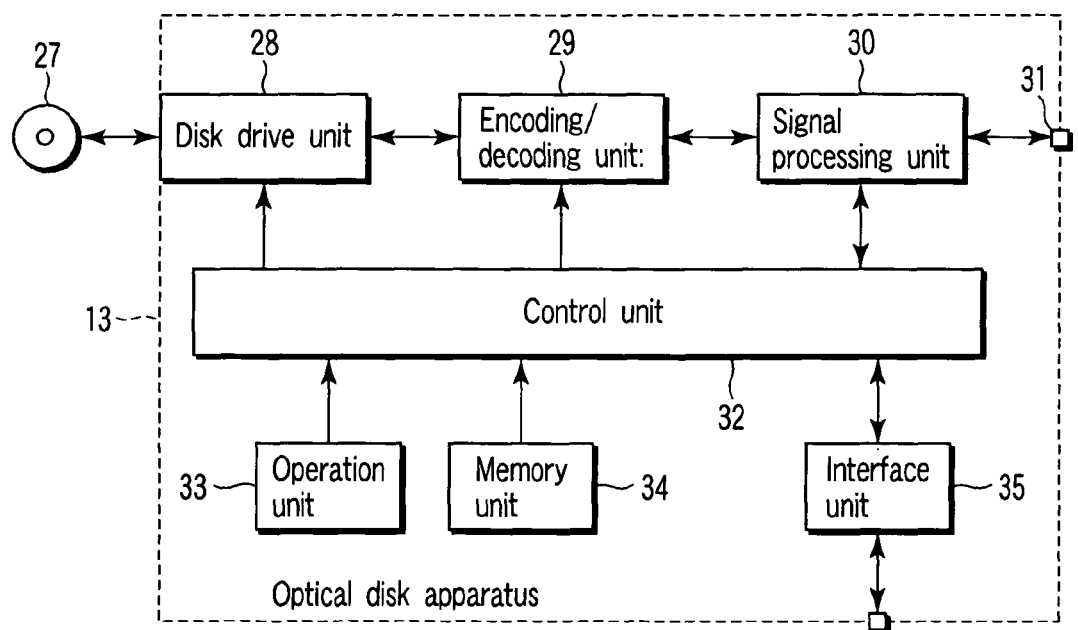
FIG. 5

CONTENT OUTPUT APPARATUS, CONTENT OUTPUT METHOD AND CONTENT ACQUISITION APPARATUS

CROSS-REFERENCE TO RELATED APPLICATIONS

This application is based upon and claims the benefit of priority from prior Japanese Patent Application No. 2004-346559, filed Nov. 30, 2004, the entire contents of which are incorporated herein by reference.

BACKGROUND OF THE INVENTION

1. Field of the Invention

The present invention relates to a content output apparatus and a content output method which output a content to a storage device via a network. In addition, the present invention relates to a content acquisition apparatus which acquire a content from a storage device via a network.

2. Description of the Related Art

As well known, upon recording a content in a shared storage device from a predetermined device on a network, there are two cases, namely, a case where a content is recorded remaining in a plain sentence and a case where a content is recorded while applying a local encryption to the content. The local encryption is an encryption processing that can be encrypted only by an encrypted device in order to prevent the outflow of data to the network from the viewpoint of copyright protection.

In the meantime, in consideration of a data distribution system using the network growing increasingly diverse, there is a possibility in future that a local-encrypted content recorded in a storage device is allowed to be reproduced even by a device other than the encrypted one, for example, under a special contract.

Jpn. Pat. Appln. KOKAI Publication No. 2004-133654 discloses a technique in which a system for demodulating encrypted and distributed content data by using license data including an encryption key carries out user authentication in units of license data in such a manner that user information to identify a user is included in the license data and the system can decrypt the content data when the user is determined to be appropriate.

BRIEF SUMMARY OF THE INVENTION

According to one aspect of the present invention, there is provided a content output apparatus for outputting a content to a storage device via a network and recording it therein, comprising: an encryption processing unit configured to apply an encryption processing to the content; a recording unit configured to record the content to which the encryption processing has been applied by the encryption processing unit and identification information which identifies the content itself on the network in the storage device so as to be related with each other; and an output unit configured to read a requested content from the storage device on the basis of a content acquisition request supplied via the network, decrypt the encryption, further apply a predetermined processing to the content, and transmit it on the network.

According to another aspect of the present invention, there is provided a content output method for outputting a content to a storage device via a network and recording it therein, comprising: a first step of applying an encryption processing to the content; a second step of recording in the storage device the content to which the encryption processing has been applied in the first step and identification information which identifies the content itself on the network so as to be related with each other; and a third step of reading a requested content from the storage device on the basis of a content acquisition request supplied via the network, decrypting that encryption, further applying a predetermined processing to the content, and transmitting it on the network.

According to one aspect of the present invention, there is provided a content acquisition apparatus for acquiring a predetermined content via a network from a storage device having recorded therein an encrypted content and identification information of a device configured to decrypt a code of the content so as to be related with each other, comprising: a selecting unit configured to select a predetermined content from the content recorded in the storage device; a requesting unit configured to request decryption of the code of the content selected by the selecting unit and acquisition the content from the device which is indicated by identification information corresponding to the content; and an acquisition unit configured to acquire the content transmitted from the device on the network on the basis of the request of the requesting unit.

BRIEF DESCRIPTION OF THE SEVERAL VIEWS OF THE DRAWING

FIG. 3 is a view explaining one example of data to be recorded in a storage device connected to the network according to the present embodiment;

FIG. 4 is a view explaining another example of the data to be recorded in the storage device connected to the network according to the present embodiment;

FIG. 5 is a block diagram explaining a signal processing system of an optical disk apparatus connected to the network according to the present embodiment;

DETAILED DESCRIPTION OF THE INVENTION

Figure 1:
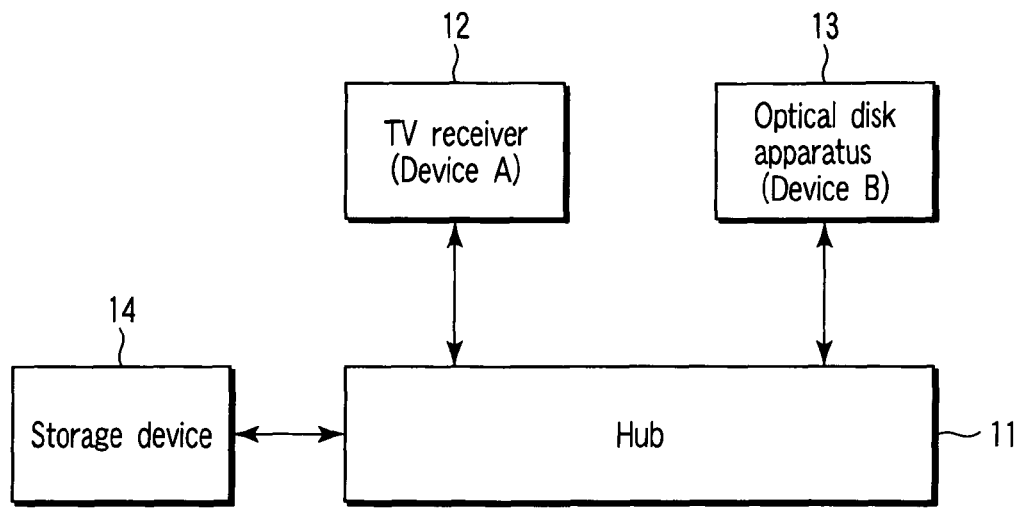
FIG. 1 is a block diagram showing an embodiment of the invention and explaining an outline of a network system.

An embodiment of the present invention will be described in detail below with reference to the drawings. FIG. 1 shows an outline of a network system that is explained in this embodiment. In other words, a TV receiver 12 as a device A, an optical disk apparatus 13 as a device B, and a shared storage device 14 are connected to a hub 11 located at the center of the network.

Among the devices, the TV receiver 12 has a function of applying a local encryption processing to a received content, supplying and recording it to the storage device 14 via the hub 11, reading out an encrypted content recorded in the storage device 14, and decrypting the encryption and reproducing the content.

In addition, the optical disk apparatus 13 has a function of recording and reproducing a content in and from an optical disk, for example, a digital versatile disk (DVD). Further, the optical disk apparatus 13 is in a situation of being allowed to reproduce a content local-encrypted and recorded in the storage device 14 by the TV receiver 12.

Figure 2:
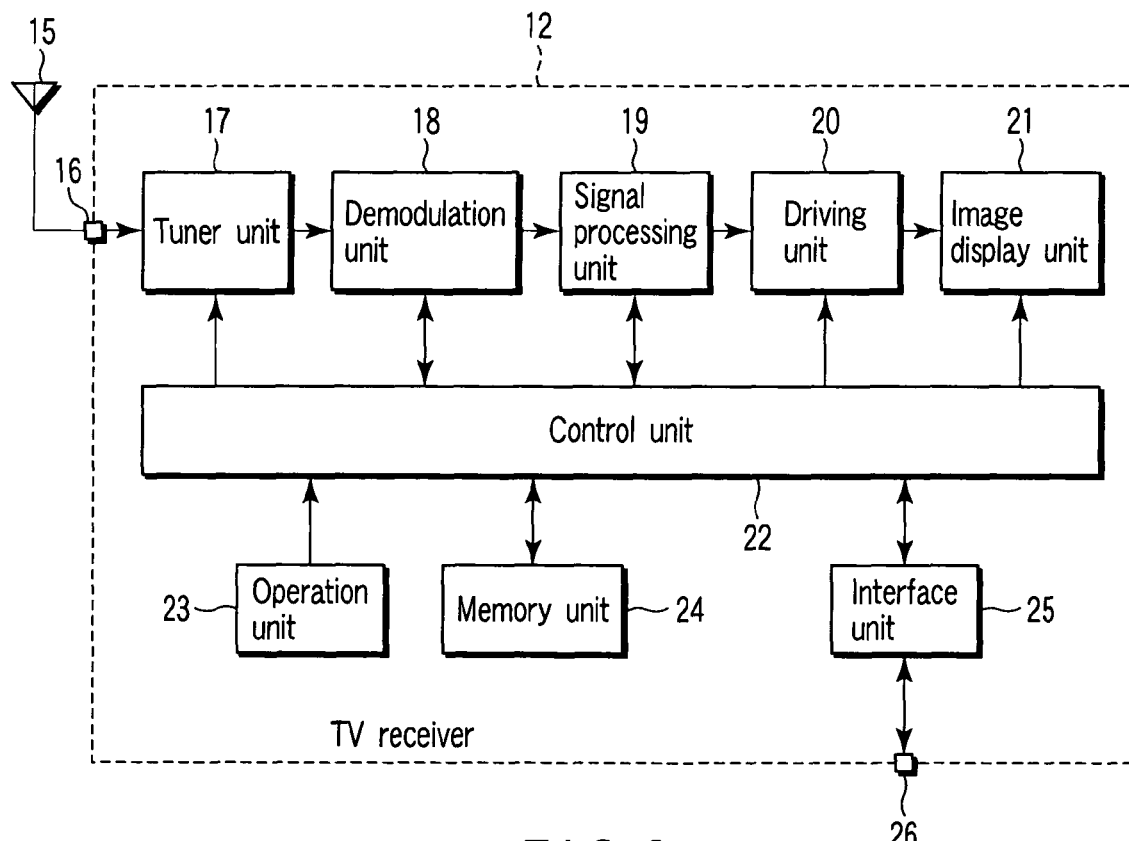
FIG. 2 is a block diagram explaining a signal processing system of a TV receiver connected to a network according to the present embodiment.

FIG. 2 shows a signal processing system of the TV receiver 12. That is, a television broadcast signal received by an antenna 15 is supplied to a tuner unit 17 via an input terminal 16. The tuner unit 17 tunes a signal of a desired broadcast channel from among the inputted television broadcast signals and outputs it.

The television broadcast signal outputted from this tuner unit 17 is subjected to a predetermined demodulation processing and signal processing, respectively, by a demodulation unit 18 and a signal proceeding unit 19 to be returned into the original television signal. Then, the TV signal outputted from the signal proceeding unit 19 is supplied to an image display unit 21 via a driving unit 20 to be served for display of the image.

Here, all the operations including a sequence of the above-described operations of the TV receiver 12 are totally controlled by a control unit 22. The control unit 22 incorporates a central processing unit (CPU) or the like, and the control unit 22 receives operation information from an operation unit 23 including a remote controller or the like, controls each unit so as to reflect the operation content.

In this case, the control unit 22 utilizes a memory unit 24. The memory unit 24 mainly has a read only memory (ROM) having stored therein a control program to be executed by the CPU, a random access memory (RAM) providing an operation area to the CPU, and a nonvolatile memory which stores therein various setting information, control information and the like.

Further, an interface unit 25 is connected to the control unit 22. The interface unit 25 is connected to the hub 11 via a connection terminal 26. Thereby, the control unit 22 can transmit a content to the optical disk apparatus 13 and the storage device 14 via the hub 11.

Namely, by applying the local encryption processing to the content (the TV signal) outputted from the signal proceeding unit 19, the control unit 22 can record the content in the storage device 14. In this case, as shown in FIG. 3, the control unit 22 adds identification information that enables to identify the local-encrypted content itself on the network to the content, and transmits it to the storage device 14 and records it therein.

As shown in FIG. 3, the identification information can be incorporated not only in a head of the local-encrypted content but also at the last or the inside thereof.

In addition, other than adding the identification information to the local-encrypted content itself, as shown in FIG. 4, the control unit 22 can create a management table which relates a content name of a content that is local-encrypted and recorded in the storage device 14 to identification information and can record the management table in the storage device 14.

The management table indicates that a content such as a content name c to which no identification information is added is not subjected to the local encryption, and that the content is not recorded.

In brief, the local-encrypted content and the identification information for enabling to identify the device which has applied the local encryption to that content on the network are recorded in the storage device 14 so as to be related with each other. Thereby, the device on the network can easily determine what content is local-encrypted by what device only seeing the recorded content of the storage device 14.

Here, an identifier on the network of the local-encrypted device is incorporated in the identification information. Further, key information that can decrypt a local code may be incorporated in the identification information by combining the identification information with information acquired through a secure communication with respect to the local-encrypted device.

As the identifier on the network, for example, a name of a NetBIOS (network basic input/output system), an IP (internet protocol) address, a MAC (media access control) address, identification information for address resolution with an UPnP (universal plug and play) and the like are used.

FIG. 5 shows a signal processing system of the optical disk apparatus 13. That is, an optical disk 27 such as a DVD is mounted on a disk drive unit 28. Then, if reproduction is required, the disk drive unit 28 reads data recorded in the optical disk 27 therefrom and outputs it.

Then, the signal outputted from the disk drive unit 28 is subjected to a predetermined decoding processing and a predetermined signal processing by an encoding/decoding unit 29 and a signal processing unit 30, respectively, to be restored into the original video or audio signal, and then, the signal is introduced from an input/output terminal 31 to the outside.

In addition, when recording is requested to the optical disk 27, the video or audio supplied to the input/output terminal 31 is subjected to a predetermined encoding processing and a predetermined signal processing by the encoding/decoding unit 29 and the signal processing unit 30, respectively, to be converted into a signal for recording. Then, the signal is recorded in the optical disk 27 via the disk drive unit 28.

Here, all the operations including a sequence of the above-described operations of the optical disk apparatus 13 are totally controlled by a control unit 32. The control unit 32 incorporates a CPU or the like therein, and the control unit 32 receives operation information from an operation unit 33 including a remote controller or the like, and controls each unit so as to reflect the operation content.

In this case, the control unit 32 utilizes a memory unit 34. The memory unit 34 mainly has a read only memory (ROM) having stored therein a control program to be executed by a CPU, a random access memory (RAM) providing an operation area to the CPU, and a nonvolatile memory which stores therein various setting information, control information and the like.

In addition, an interface unit 35 is connected to the control unit 32. The interface unit 35 is connected to the hub 11 via a connection terminal 36. Thereby, the control unit 32 can transmit the content to the TV receiver 12 and the storage device 14 via the hub 11.

Here, as described above, the optical disk apparatus 13 is in a situation of being allowed to reproduce the content that is local-encrypted by the TV receiver 12 and is recorded in the storage device 14.

Then, in the case of reproducing the content that is local-encrypted by the TV receiver 12 and is recorded in the storage device 14, first, the optical disk apparatus 13 selects a content to be reproduced from the content recorded in the storage device 14. Thereafter, the optical disk apparatus 13 determines that the device that has local-encrypted the content is the TV receiver 12 from identification information corresponding to the selected content.

Then, the optical disk apparatus 13 requests the TV receiver 12 to read the content recorded in the storage device 14, decrypt the local encryption of the content, and transmit the content to the optical disk apparatus 13.

The TV receiver 12 having accepted this request authenticates the request with respect to the optical disk apparatus 13.

When determining that the request is acceptable, the TV receiver 12 reads the content from the storage device 14, decrypts the local encryption of the content, and transmits the content to the optical disk apparatus 13 while applying the local encryption processing that can be only established with respect to the optical disk apparatus 13 to the content. Thereby, the optical disk apparatus 13 can reproduce the content that is local-encrypted by the TV receiver 12 and is recorded in the storage device 14.

Figure 6:
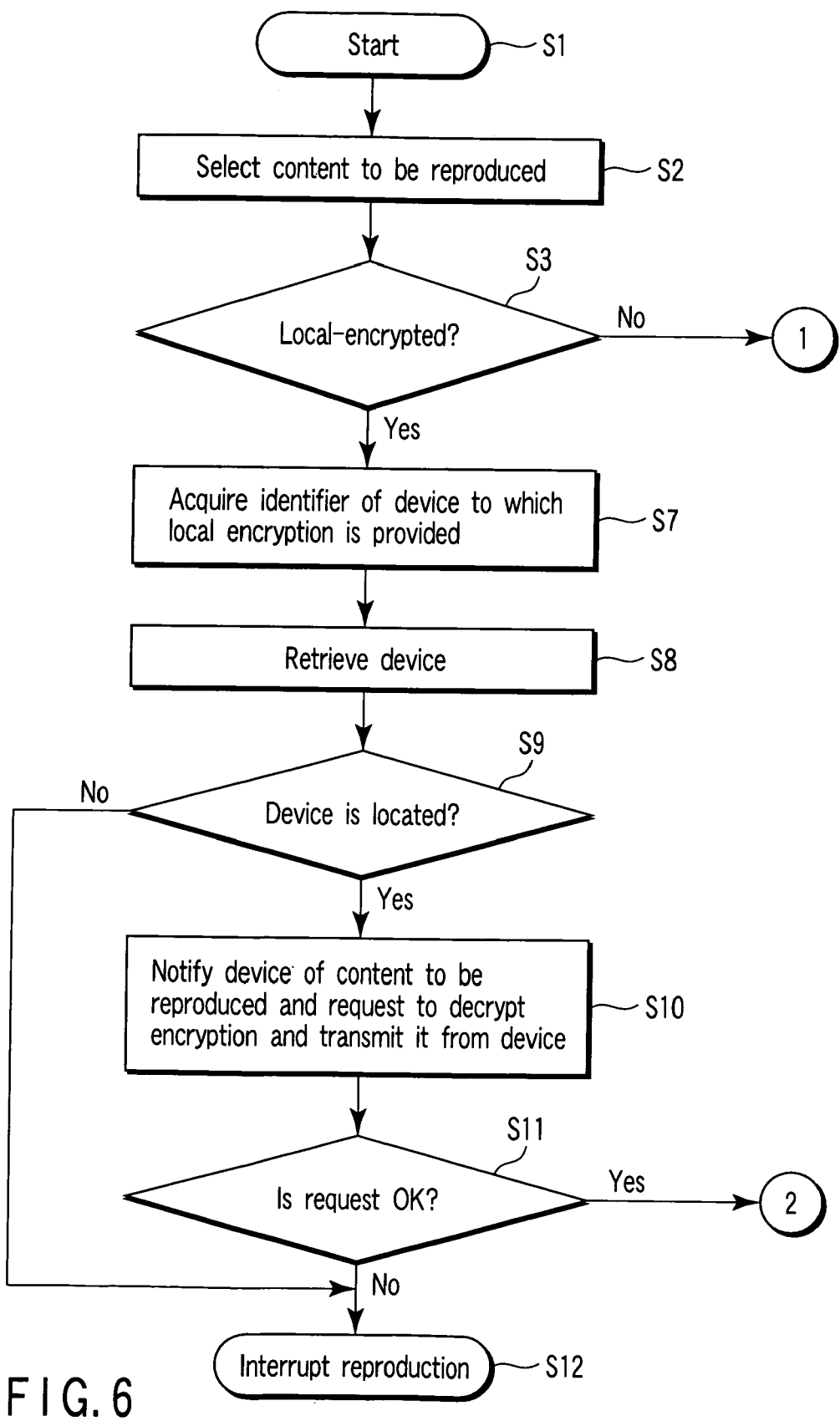
FIG. 6 is a flowchart explaining a main processing operation of each device connected to the network according to the present embodiment.
Figure 7:
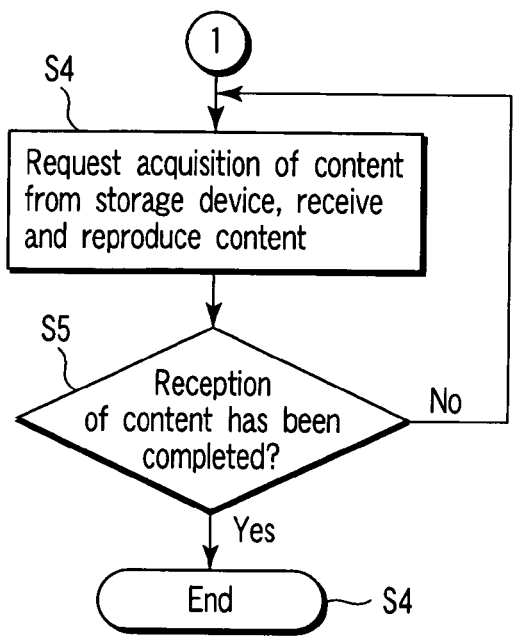
FIG. 7 is a flowchart explaining the main processing operation of each device connected to the network according to the present embodiment.
Figure 8:
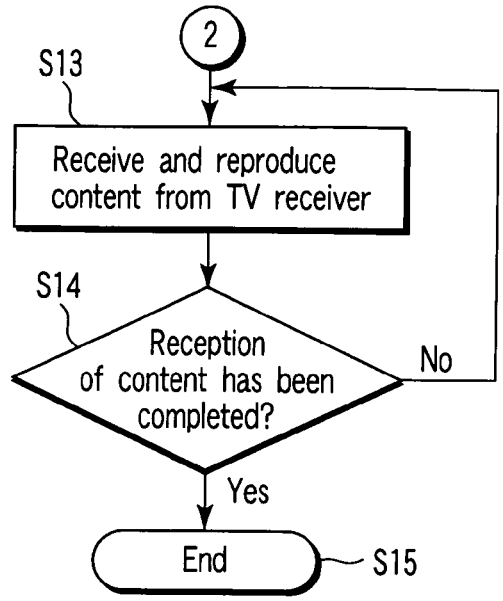
FIG. 8 is a flowchart explaining the main processing operation of each device connected to the network according to the present embodiment.

FIGS. 6 to 8 are flow charts collecting a sequence of the above-described processing and operations in order for the optical disk apparatus 13 to reproduce the content that is local-encrypted by the TV receiver 12 and is recorded in the storage device 14.

In other words, if the processing is started by requesting the reproduction of the content (step S1), the control unit 32 of the optical disk apparatus 13 selects the content to be reproduced from among a plurality of contents recorded in the storage device 14 in step S2, and determines whether or not the selected content is local-encrypted in step S3.

Then, when the selected content is determined not to be local-encrypted (NO), the control unit 32 generates a request to acquire the selected content to the storage device 14, and receives and reproduces the content transmitted from the storage device 14 in step s4.

Thereafter, the control unit 32 determines whether or not the content has been received completely from the storage device 14 in step S5. Then, if the content is determined not to be completely received (NO), the process returns to the processing of step S4, and if the content is determined to be completely received (YES), the reproduction processing of the content is terminated (step S6).

In addition, when the selected content is determined to be local-encrypted in the step S3 (YES), the control unit 32 acquires an identifier of the device that has local-encrypted the content (in this case, the TV receiver 12) from the storage device 14 in step S7, and the control unit 32 retrieves a device corresponding to the identifier on the network in step S8.

Then, the control unit 32 determines whether or not the device corresponding to the identifier is located on the network, and if it is determined not to be located (NO), the reproduction processing of the content is interrupted (step S12).

On the other hand, when the device corresponding to the identifier is located on the network in the step S9 (YES), the control unit 32 notifies the device of the content to be reproduced in step S10, reads the content from the storage device 14, and requests decryption of the local encryption and transmission thereof to the optical disk apparatus 13 from the device.

Then, the device having received this request, namely, the control unit 22 of the TV receiver 12 in this case carries out the authentication with respect to the device that has transmitted the request in the step S11, namely, the optical disk apparatus 13, and determines whether or not the request is acceptable. If the request is determined no to be acceptable (NO), the control unit 22 interrupts the reproduction processing of the content (step S12).

In addition, when it is determined that the request is acceptable in the step S11 (YES), the control unit 22 of the TV receiver 12 reads the requested content from the storage device 14 and decrypts the local encryption. Then, by applying the local encryption, for example, a DTCP (Digital Transmission Content Protection) that can be only established with respect to the optical disk apparatus 13 to the content of which local encryption is decrypted, the control unit 22 transmits this content to the optical disk apparatus 13.

Then, the control unit 32 of the optical disk apparatus 13 receives the content transmitted from the TV receiver 12 in step S13, decrypts the local encryption, and reproduces the content. Thereafter, the control unit 32 determines whether or not the content has been completely received from the TV receiver 12. If the content is determined not to be completely received (NO), the process returns to the processing of the step S13, and if the content is determined to be completely received (YES), the reproduction processing of the content is terminated (step S15).

According to the above-described embodiment, it is intended that the local-encrypted content and the identification information on the network of the device that has applied the local encryption to that content are recorded in the storage device 14 so as to be related with each other. Therefore, the other device can easily determine the device that has applied the local encryption to the content of which reproduction is requested. By requesting the decryption and distribution of the local encryption of the content to that device, it is possible to easily acquire the content, of which code is decrypted.

Further, when the optical disk apparatus 13 requests decryption of local encryption of the content and transmission thereof from the TV receiver 12, the TV receiver 12 carries out authentication with the optical disk apparatus 13, and determine whether or not the received request is acceptable. In addition, in the case of transmitting the content to the optical disk apparatus 13, the TV receiver 12 applies the local encryption that can be only established with respect to the optical disk apparatus 13 to the content and transmits that content. Consequently, it is possible to sufficiently keep confidentiality of the content.

Figure 9:
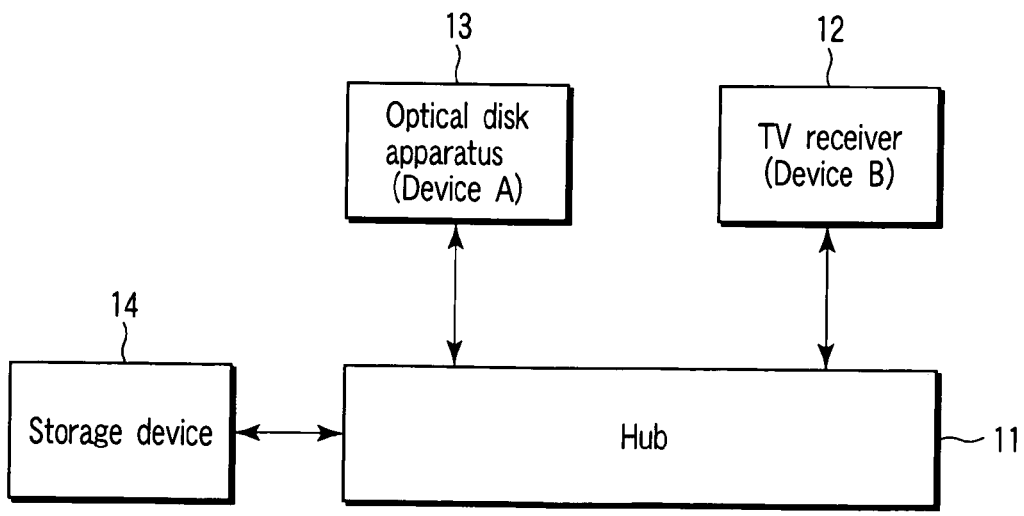
FIG. 9 is a block diagram explaining a modified example according to the present embodiment.

As shown in FIG. 9, it is also possible that the optical disk apparatus 13 has a function as the apparatus A that encrypts the content to be recorded or reproduced in or from the optical disk 27 and records the content and the identification information of the content itself so as to be related with each other; and a function as the apparatus B that the TV receiver 12 selects the content from the storage device 14, discriminates the device that has applied the local encryption to that content, and requests the decryption of the code and the distribution of the content to that device.

In addition to this, as the devices A and B, various devices, such as a personal computer (PC) and a set top box (STB) are available.

Further, respective devices A, B, the storage device 14 and the like can be communicably connected to the hub 11 in any format of a wired format and a wireless format.

In the meantime, the present invention is not limited to the embodiments as it is. However, the constituent elements variously changed within a range not deviating from the spirit thereof can be embodied in an implement phase. In addition, by combining a plurality of constituent elements disclosed in the above-described embodiments appropriately, various inventions can be formed. For example, from all constituent elements disclosed in the embodiment, some constituent elements may be deleted. Further, the constituent elements according to the different embodiments may be appropriately combined.

What is claimed is:

1. A content recording and reproducing system for recording and reproducing content in and from a storage device via a network, the content recording and reproducing system comprising:

an encryption processing unit configured to cause one of one or more first devices to encrypt the content to be recorded in the storage device, the first device being configured to output the content;

a recording processing unit configured to cause the one of the one or more first devices to record in the storage device the content encrypted by the one of the one or more first devices and identification information which identifies the one of the one or more first devices which has encrypted the content, the encrypted content and the identification information being related to each other;

a selection processing unit configured to cause a second device to select a desired one of a plurality of contents recorded in the storage device, the second device being configured to request reproduction of a content recorded in the storage device;

an identification processing unit configured to cause the second device to identify the first device which has encrypted the selected content, based on the identification information related to the selected content;

a request processing unit configured to cause the second device to issue, in the network, an acquisition request for acquisition of the selected content, which is to be supplied to the identified first device;

an authentication processing unit configured to cause the first device to authenticate the second device which has issued the acquisition request, when the acquisition request is supplied to the first device through the network;

an output processing unit configured to cause the first device to read the content for which the acquisition request is issued, from the storage device, decrypt the content, subject the decrypted content to processing of encryption which is applicable between the first device and the second device which has issued the acquisition request, and transmitting the content onto the network; and a reproduction processing unit configured to cause the second device to decrypt and reproduce the content supplied from the first device through the network.

2. The content recording and reproducing system according to claim 1, wherein the recording unit is configured to add the identification information which identifies the content itself on the network to the content to which the encryption processing has been applied by the encryption processing unit, and cause the storage device to record it therein.

3. The content recording and reproducing system according to claim 1, wherein the recording unit is configured to record on the storage device a management table which relates a name of the content to which the encryption processing has been applied by the encryption processing unit to the identification information which identifies the content itself on the network.

* * * * *